(12) United States Patent
Marr et al.

(10) Patent No.: US 8,996,744 B1
(45) Date of Patent: *Mar. 31, 2015

(54) MANAGING FIRMWARE UPDATE ATTEMPTS

(71) Applicant: Amazon Technologies, Inc., Reno, NV (US)

(72) Inventors: Michael David Marr, Monroe, WA (US); Pradeep Vincent, Kenmore, WA (US); Matthew T. Corddry, Seattle, WA (US); James R. Hamilton, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/094,642

(22) Filed: Dec. 2, 2013

Related U.S. Application Data

(63) Continuation of application No. 12/555,455, filed on Sep. 8, 2009, now Pat. No. 8,601,170.

(51) Int. Cl.
| | |
|---|---|
| *G06F 3/00* | (2006.01) |
| *G06F 13/28* | (2006.01) |
| *G06F 11/30* | (2006.01) |
| *G06F 9/44* | (2006.01) |
| *G06F 21/57* | (2013.01) |

(52) U.S. Cl.
CPC ..................................... *G06F 21/57* (2013.01)
USPC ................... 710/8; 710/15; 710/22; 713/189; 713/191; 713/193; 717/168; 717/171

(58) Field of Classification Search
CPC ..... G06F 9/4411; G06F 13/28; G06F 9/4401; G06F 21/72; G06F 21/572; G06F 21/10; G06F 8/65; H04L 43/0817

USPC .............. 710/8, 15, 22; 713/2, 189, 191, 193, 713/201; 717/168, 171
See application file for complete search history.

(56) References Cited

U.S. PATENT DOCUMENTS

| | | | |
|---|---|---|---|
| 4,939,382 | A | 7/1990 | Gruodis |
| 5,530,753 | A | 6/1996 | Easter et al. |
| 5,799,086 | A | 8/1998 | Sudia |

(Continued)

OTHER PUBLICATIONS

"Final Office Action dated May 22, 2012", U.S. Appl. No. 12/555,455, filed May 22, 2012, 25 pages.

(Continued)

*Primary Examiner* — Idriss N Alrobaye
*Assistant Examiner* — Henry Yu
(74) *Attorney, Agent, or Firm* — Novak Druce Connolly Bove + Quigg LLP

(57) ABSTRACT

Attempts to update confirmation information or firmware for a hardware device can be monitored using a secure counter that is configured to monotonically adjust a current value of the secure counter for each update or update attempt. The value of the counter can be determined every time the validity of the firmware is confirmed, and this value can be stored to a secure location. At subsequent times, such as during a boot process, the actual value of the counter can be determined and compared with the expected value. If the values do not match, such that the firmware may be in an unexpected state, an action can be taken, such as to prevent access to, or isolate, the hardware until such time as the firmware can be validated or updated to an expected state.

21 Claims, 5 Drawing Sheets

(56) References Cited

U.S. PATENT DOCUMENTS

| | | | |
|---|---|---|---|
| 5,819,087 A | 10/1998 | Le et al. |
| 5,937,169 A | 8/1999 | Connery et al. |
| 6,009,274 A | 12/1999 | Fletcher et al. |
| 6,385,727 B1 | 5/2002 | Cassagnol et al. |
| 6,615,349 B1 | 9/2003 | Hair |
| 6,665,725 B1 | 12/2003 | Dietz et al. |
| 6,944,854 B2 | 9/2005 | Kehne |
| 6,957,328 B2 | 10/2005 | Goodman et al. |
| 7,055,148 B2 | 5/2006 | Marsh et al. |
| 7,293,129 B2 | 11/2007 | Johnsen et al. |
| 7,305,668 B2 | 12/2007 | Kennedy et al. |
| 7,305,711 B2 | 12/2007 | Ellison et al. |
| 7,350,083 B2 | 3/2008 | Wells et al. |
| 7,406,518 B2 | 7/2008 | Lasserre |
| 7,506,149 B2 | 3/2009 | Rothman et al. |
| 7,512,684 B2 | 3/2009 | Ronciak et al. |
| 7,526,516 B1* | 4/2009 | Pavlyushchik ................. 1/1 |
| 7,730,295 B1 | 6/2010 | Lee |
| 7,739,422 B2 | 6/2010 | Hua |
| 7,739,487 B2 | 6/2010 | Mylly et al. |
| 7,796,646 B2 | 9/2010 | Das et al. |
| 7,836,226 B2 | 11/2010 | Flynn et al. |
| 8,102,881 B1 | 1/2012 | Vincent |
| 2002/0073304 A1 | 6/2002 | Marsh et al. |
| 2002/0080784 A1 | 6/2002 | Krumel |
| 2002/0092008 A1 | 7/2002 | Kehne et al. |
| 2002/0150243 A1 | 10/2002 | Craft et al. |
| 2002/0157011 A1 | 10/2002 | Thomas, III |
| 2003/0005276 A1 | 1/2003 | French et al. |
| 2003/0023966 A1* | 1/2003 | Shimizu et al. ............. 717/175 |
| 2003/0058860 A1 | 3/2003 | Kunze et al. |
| 2003/0074657 A1 | 4/2003 | Bramley, Jr. et al. |
| 2003/0115471 A1 | 6/2003 | Skeba |
| 2003/0185207 A1 | 10/2003 | Nakahara |
| 2004/0015941 A1 | 1/2004 | Sekine |
| 2004/0024917 A1 | 2/2004 | Kennedy et al. |
| 2004/0025036 A1 | 2/2004 | Balard et al. |
| 2004/0049669 A1 | 3/2004 | Schelling et al. |
| 2004/0071142 A1 | 4/2004 | Moriwaki et al. |
| 2004/0088542 A1 | 5/2004 | Daude et al. |
| 2004/0117640 A1 | 6/2004 | Chu et al. |
| 2004/0128549 A1 | 7/2004 | Poisner |
| 2004/0158702 A1 | 8/2004 | Tasaki |
| 2004/0162915 A1 | 8/2004 | Caronni et al. |
| 2004/0187103 A1 | 9/2004 | Wickham et al. |
| 2004/0249974 A1 | 12/2004 | Alkhatib et al. |
| 2005/0131997 A1 | 6/2005 | Lewis et al. |
| 2005/0188102 A1 | 8/2005 | Madajczak |
| 2005/0207421 A1 | 9/2005 | Suzuki |
| 2005/0265351 A1 | 12/2005 | Smith et al. |
| 2006/0015751 A1 | 1/2006 | Brickell et al. |
| 2006/0026301 A1 | 2/2006 | Maeda et al. |
| 2006/0047938 A1 | 3/2006 | Park et al. |
| 2006/0047942 A1 | 3/2006 | Rothman et al. |
| 2006/0080522 A1 | 4/2006 | Button et al. |
| 2006/0107071 A1 | 5/2006 | Girish et al. |
| 2006/0143473 A1 | 6/2006 | Kumar |
| 2006/0159088 A1 | 7/2006 | Aghvami et al. |
| 2006/0174109 A1 | 8/2006 | Flynn |
| 2006/0182103 A1 | 8/2006 | Martini et al. |
| 2006/0277346 A1 | 12/2006 | Doak et al. |
| 2007/0168652 A1 | 7/2007 | Mylly et al. |
| 2007/0223483 A1 | 9/2007 | Huang et al. |
| 2008/0083036 A1 | 4/2008 | Ozzie et al. |
| 2008/0086729 A1 | 4/2008 | Kondoh et al. |
| 2008/0104701 A1 | 5/2008 | Peacock et al. |
| 2008/0147965 A1 | 6/2008 | Eriksson et al. |
| 2008/0189697 A1* | 8/2008 | Kachroo et al. ............. 717/171 |
| 2008/0225875 A1 | 9/2008 | Wray et al. |
| 2008/0267177 A1 | 10/2008 | Johnson et al. |
| 2008/0295098 A1 | 11/2008 | Cardona et al. |
| 2008/0307229 A1 | 12/2008 | Andersson et al. |
| 2009/0034431 A1 | 2/2009 | Nagarajan et al. |
| 2009/0077280 A1* | 3/2009 | Anderson et al. ............. 710/62 |
| 2009/0094421 A1 | 4/2009 | Lewis |
| 2009/0138875 A1 | 5/2009 | Rothman et al. |
| 2009/0300149 A1 | 12/2009 | Ferris et al. |
| 2010/0023777 A1 | 1/2010 | Prevost et al. |
| 2010/0070623 A1 | 3/2010 | Sawada |
| 2010/0088500 A1 | 4/2010 | Ball et al. |
| 2010/0100733 A1 | 4/2010 | Jaber et al. |
| 2010/0107162 A1 | 4/2010 | Edwards et al. |
| 2010/0125856 A1 | 5/2010 | Dash et al. |
| 2010/0223397 A1 | 9/2010 | Elzur |
| 2010/0266132 A1 | 10/2010 | Bablani et al. |
| 2010/0293289 A1 | 11/2010 | Hsu et al. |

OTHER PUBLICATIONS

"Final Office Action dated Sep. 17, 2012", U.S. Appl. No. 12/556,432, filed Sep. 17, 2012, 42 pages.

"Non Final Office Action dated Jan. 14, 2013", U.S. Appl. No. 12/556,432, filed Jan. 14, 2013, 50 pages.

"Non Final Office Action dated Dec. 15, 2011", U.S. Appl. No. 12/555,455, filed Dec. 15, 2011, 19 pages.

"Non Final Office Action dated Dec. 16, 2013", U.S. Appl. No. 12/556,432, 43 pages.

"Non Final Office Action dated Feb. 20, 2013", U.S. Appl. No. 12/555,455, filed Feb. 20, 2013, 34 pages.

"Non Final Office Action dated Mar. 29, 2012", U.S. Appl. No. 12/556,432, filed Mar. 29, 2012, 31 pages.

"Non Final Office Action dated Jul. 8, 2011", U.S. Appl. No. 12/555,455, filed Jul. 8, 2011, 17 pages.

"Preboot Execution Environment (PXE)Specification", Version 2.1, Sep. 20, 1999, 103 pages.

Viswanathan, Arun, "Virtualization with XEM", Trusted Computing CS599, University of Southern California., 2007, 21 pages.

* cited by examiner

MANAGING FIRMWARE UPDATE ATTEMPTS

This application is a continuation of allowed U.S. application Ser. No. 12/555,455, entitled "Managing Firmware Update Attempts," filed Sep. 8, 2009; of which the full disclosure of this application is incorporated herein by reference for all purposes.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed for such resources.

In some cases, users may want special hardware or full access to specific resources. Such access comes with risks for providers of those resources, however, as in a cloud or other shared environment there typically will be other users sharing those resources at various times, and a modification of the resource by one user can potentially be detrimental to subsequent users. In order to ensure that one user does not alter the hardware, software, or configuration information in an inappropriate way that will affect other users, such as by altering firmware to inject malicious code, it can be necessary to re-image the resource after each user. Such an approach might be acceptable in situations where users have dedicated access to a resource for an extended period of time, but in a cloud or similar environment where the user of a resource could change several times over a short period of time, such an approach can be too expensive and resource intensive. Further, in order to determine whether the firmware has been altered, it can be necessary to validate the firmware before provisioning a new user, which can be a time intensive process that consumes resources that could be dedicated to other tasks.

BRIEF DESCRIPTION OF THE DRAWINGS

Various embodiments in accordance with the present disclosure will be described with reference to the drawings, in which.

DETAILED DESCRIPTION

Figure 1:
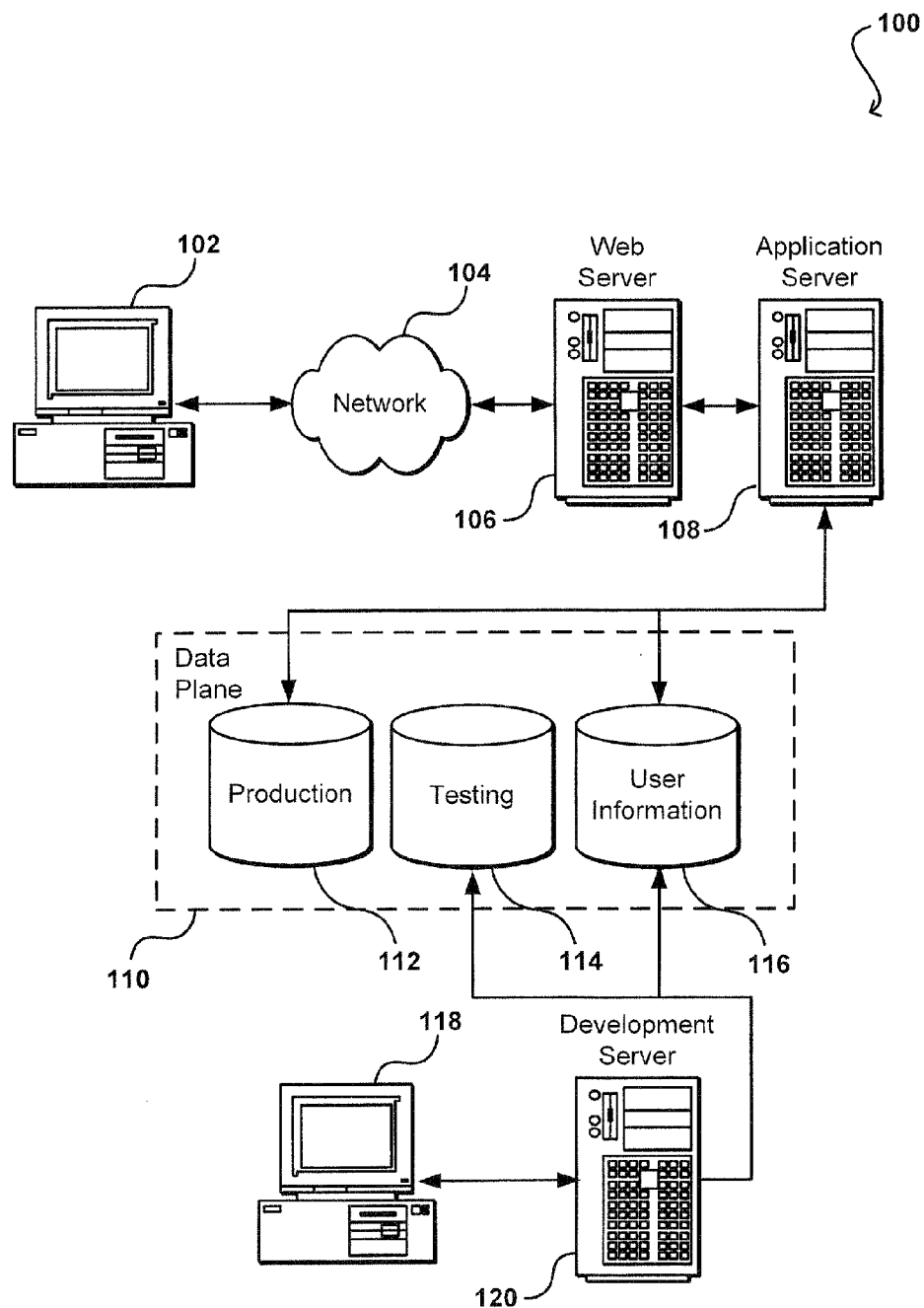
FIG. 1 illustrates an environment in which various embodiments can be implemented.

Systems and methods in accordance with various embodiments of the present disclosure may overcome one or more of the aforementioned and other deficiencies experienced in conventional approaches to managing resources in an electronic environment. In various embodiments, users are provided with full or substantially full or "native" access to one or more hardware resources in a network, cloud, or other shared environment. In other embodiments, users have access to only one or more devices or components, such as a network interface card (NIC) or graphics processing unit (GPU) on a peripheral component interconnect (PCI) bus, on a host machine. In a situation where the users having access to such a resource can change frequently, it can be desirable to prevent users from modifying, or at least track the modifying, of firmware or other configuration information for the resource, which can affect an ability of a subsequent user to effectively or securely utilize the resource.

In some embodiments, at least one secure monotonic counter is implemented that is configured to monotonically update a current value upon each update, or attempted update, of firmware or other configuration information for a hardware device. Such a counter thus can either increment or decrement by one count (or other such value) for each update or attempted update. For a host machine that includes a number of hardware components such as peripheral devices, for example, there can be one counter for the host, one for the set of peripheral devices, a counter for each individual device, or any other appropriate combination, implemented in hardware and/or software. Each time a valid state of firmware or configuration information for a device is verified, the current value of the corresponding counter can be determined and stored in a secure location. At a subsequent time, such as during a boot process or prior to the provisioning of a new user, the actual value of the counter can be compared with the expected value that is stored securely and inaccessible to guest users of the host. If the numbers match, the firmware has likely not been modified as any update would have incremented or decremented the counter, and the processes on the host can continue. If the numbers do not match, then the firmware or other configuration information may have been changed or otherwise compromised, at which point one or more actions can be taken. In some embodiments, this can include isolating the host and provisioning the user on other hardware. In other embodiments, this can include setting a flag that indicates the firmware is to be validated or flashed before provisioning a new user on the hardware. Any of a number of other such remedial actions can be taken as well, as described herein. Such an approach can be desirable in a number of situations, as a quick determination can be made as to whether firmware or other such information might have been compromised, and it can be much easier to detect that something has changed than to attempt to prevent all mechanisms for making the change in the first place.

In embodiments where a host machine, hardware device, or group of machines and/or devices include multiple secure counters, a current value of these counters can be aggregated using what is referred to herein as a "master" counter. In one embodiment, the value of the master counter can be incremented each time one of the respective counters is incremented. In another embodiment, the master counter is computed, perhaps upon request, as the bitwise concatenation of the individual counters. Other embodiments or combinations thereof can be constructed depending on various security and hardware design criteria, as long as the master counter preserves the monotonic quality. Where the master counter aggregates values of the individual counters, each counter can be configured to count monotonically in the same direction (e.g., each counter increases or decreases the count upon an update or update attempt), such that the aggregated value accurately represents a current state of the system. The current value of the master counter can be compared to an expected value for the master counter, and if the numbers match then it can quickly be determined that the configuration information (e.g., firmware) for all monitored devices is in the expected state. For example, a technician might verify the current value of a master counter as displayed on the outside of a server rack, where the master counter reflects the state of the configuration information for each host, switch, and/or device in that rack. The technician then can quickly verify whether the components of the rack are in an expected state, or whether further investigation is needed to determine which configuration information may have changed. The counter information can be aggregated using a secure channel that is inaccessible to the user, and the information can be aggregated to a master counter internal or external to the monitored component(s).

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing testing data 114, which can be used with the user information for the testing side. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 or development server 120, and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide at least one resource access gateway, or control plane, either as part of the data environment or in a path between the user and the data plane, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a cloud without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control plane 208 can be used in some environments to provide and/or manage access to various resources in the data plane 232. In a cloud computing environment, this can correspond to a cloud manager 210 or similar system that manages access to the various resources in the cloud. In one embodiment, a set of application programming interfaces (APIs) 220 or other such interfaces are provided that allow a user or customer to make requests for access to various resources. Once access is established, a resource is allocated, etc., a user can communicate directly with the resource to perform certain tasks relating to that resource, such as data storage or processing. The user can use direct interfaces or APIs to communicate with the data instances, hosts, or other resources once access is established, but uses the control plane component(s) to obtain the access.

Figure 2:
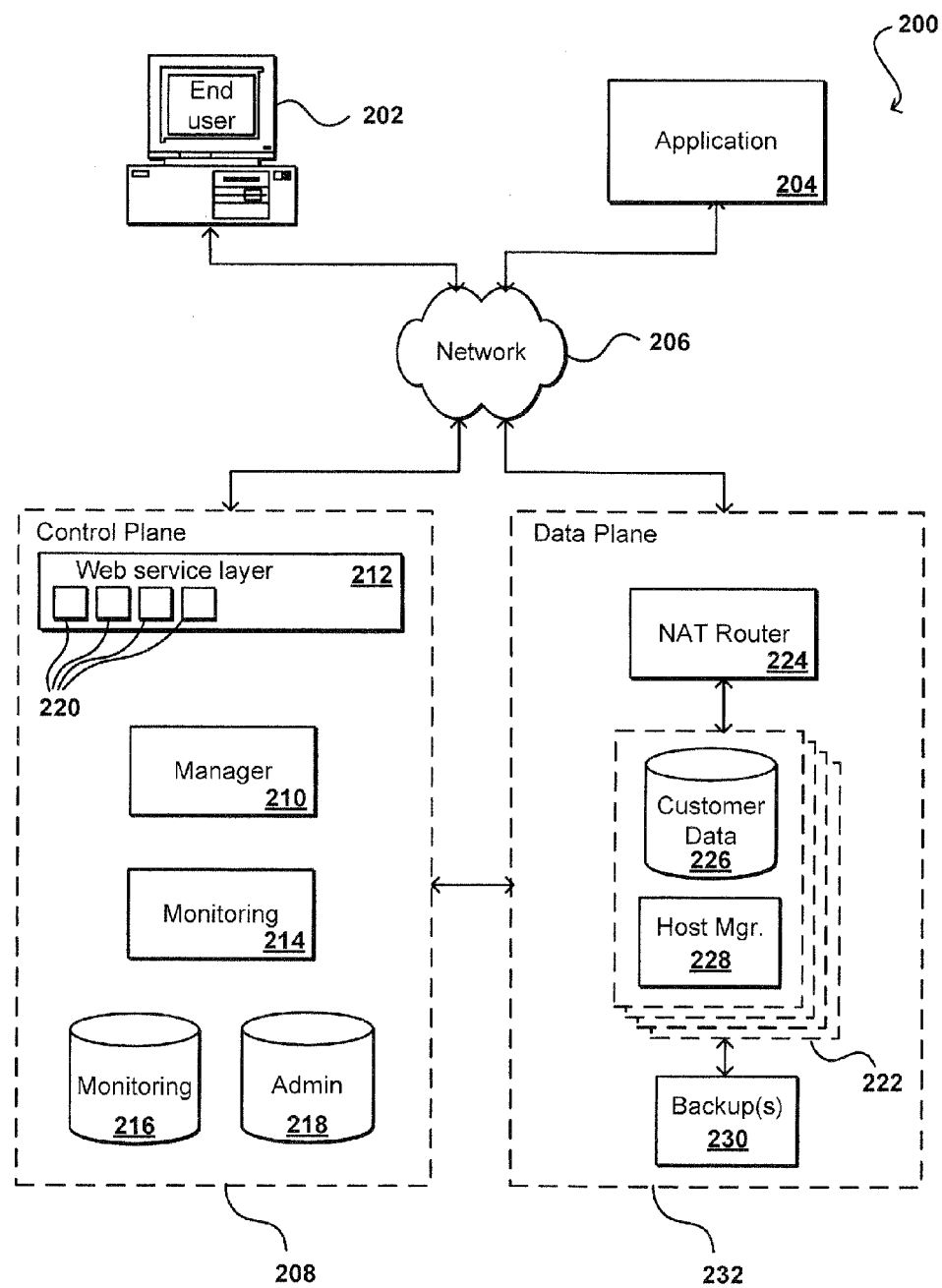
FIG. 2 illustrates an environment for providing access to various resources that can be used in accordance with one embodiment.

FIG. 2 illustrates an example of a configuration 200, such as may include a cloud computing manager system, that can be used in accordance with one embodiment. In this example, a computing device 202 for an end user is shown to be able to make calls through a network 206 to a control plane 208 (or other such access layer) to perform a task such as to obtain access to a specified resource or resource type. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data "plane," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs (or other such interfaces) for receiving Web services calls or other such requests from across the network 206, which a Web services layer 212 can parse or otherwise analyze to determine the steps or actions needed to act on or process the call. For example, a Web service call might be received that includes a request to establish a connection to a data repository for to execute a query for a user. In this example, the Web services layer can parse the request to determine the type of connection or access needed, the appropriate type(s) of resource needed, or other such aspects.

The control plane can include one or more resource allocation managers 210, each responsible for tasks such as validating the user or client associated with the request and obtaining or allocating access to the appropriate resource(s). Such a system can handle various types of request and establish various types of connection. Such a system also can handle requests for various types of resources, such as specific graphic processors or other types of hardware or hardware functionality, and can provide access to the appropriate resource(s). Components of the data plane, or the resource layer of the cloud, can perform the necessary tasks to provide the resource. For access to a data instance, for example, this can include tasks such as provisioning a data store instance, allocating a volume of off-instance persistent storage, attaching the persistent storage volume to the data store instance, and allocating and attaching a DNS address or other address, port, interface, or identifier which the customer can use to access or otherwise connect to the data instance. For tasks such as obtaining processing of an instruction using a particular type of hardware, for example, the components of the data plane, in conjunction with the control plane, can perform actions such as provisioning a device for a user and providing shared and/or dedicated access to the resource for a period of time at a particular level of access to the resource. In this example, a user can be provided with the DNS address and a port address to be used to access a resource. A user then can access the resource directly using the DNS address and port, without having to access or go through the control plane 208.

The control plane 208 in this embodiment also includes at least one monitoring component 214. When a data instance or other resource is allocated, created, or otherwise made available in the data plane, information for the resource can be written to a data store accessible to the control plane, such as a monitoring data store 216. It should be understood that the monitoring data store can be a separate data store or a portion of another data store. A monitoring component 214 can access the information in the monitoring data store 216 to determine information such as the past usage of resources by various users, a current number or type of threads or resources being allocated to a user, and other such usage information. A monitoring component also can call into components of the data environment to determine information such as the number of active connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") or similar data store 216, which can store information such as the general allocation granted to a user, throttling or limiting information for a user, resource permissions for a user, or any other such information that can be specified and/or updated by an administrator or other such user.

In an example where users request connections to various data instances, each instance 222 in the data environment can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager can also perform and/or manage the installation of software patches and upgrades for the data store and/or operating system. A host manager also can collect relevant metrics, such as may relate to CPU, memory, and I/O usage.

The resource manager 210 can communicate periodically with each host manager 228 for which a connection has been established, or to an administration server or other component of the resource environment, to determine status information such as load, usage, capacity, etc.

As discussed, once a resource is provisioned and a user is provided with an IP address derived from DNS mappings or other address or location, the user can communicate "directly" with components or resources of the data plane 232 through the network using a Java Database Connectivity (JDBC) or other such protocol to directly interact with that resource 222. In various embodiments, as discussed, the data plane takes the form of (or at least includes or is part of) a computing cloud environment, or a set of Web services and resources that provides data storage and access across a "cloud" or dynamic network of hardware and/or software components. An IP address derived from DNS mappings is beneficial in such a dynamic cloud environment, as instance or availability failures, for example, can be masked by programmatically remapping the IP address to any appropriate replacement instance for a use. A request received from a user 202 or application 204, for example, can be directed to a network address translation (NAT) router 224, or other appropriate component, which can direct the request to the actual resource 222 or host corresponding to the mapped address of the request Such an approach allows for instances to be dynamically moved, updated, replicated, etc., without requiring the user or application to change the IP address or other address used to access the instance. In some cases, a resource 222 such as a data instance can have at least one backup instance 230 or copy in persistent storage.

As discussed, a resource can be shared among multiple users, clients, applications, etc., either concurrently or at different times, with varying levels of access or allocation. When a user has dedicated access to a machine or resource, the user might also have native or "bare metal" access to the resource for a period of time, depending on the type of access needed, and other such factors. Providing this level of access to a resource comes with potential risks for a provider of the resource, as a user having native access to the device can have the ability to modify firmware or other configuration information for the resource, which can affect the ability of a subsequent user to utilize the resource without first re-imaging or otherwise verifying the state of the resource.

Systems and methods in accordance with various embodiments enable a provider to grant a user or customer with substantially full access to a hardware resource with a reasonable level of security. This native-level access to remote hardware can be provided for resources such as servers, hosts, and cluster instances, for example. For resources such as cluster instances, customers may have native access to a subset of the hardware resources, such as may include peripheral devices connected using a component such as a peripheral component interconnect (PCI) bus. These peripheral devices can include network interface cards (NICs), graphics processing units (GPUs), and similar devices that would often be virtualized in a current cloud environment. In the some cases, a customer might have full access to an entire machine, or groups of machines, including any or all devices incorporated therein. For a group of machines such as a rack of servers, a user might be granted substantially full access to the entire rack, including any switches or other devices or components provided as part of the rack.

Certain providers present such hardware resources as a virtualized abstraction, such that management of the physical hardware can occur in a "more trustworthy" execution context, and can provide additional benefits such as the ability to migrate customers to different resources without interrupting execution and, since customers or "guests" are not tied to specific hardware, the ability for vendors to compete to provide the best utility computing value for price. Also, fewer and more simple guest instance images can be used, as guests do not need a multitude of hardware-specific drivers. Such virtualization can come with potentially significant costs, however, as virtualization can incur order-of-magnitude performance penalties for hardware that does not include native acceleration for virtualization, and virtualization of a particular hardware device can consume substantial resources unrelated to that device (e.g., a processor and/or memory used to virtualize a network interface). Also, virtualization support can lag years behind commodity availability of new hardware (e.g., video cards), and certain appliance hardware is often too specific or "niche" to ever warrant compelling virtualization support. There are potentially large market opportunities in supporting high-margin niche appliances or in being the first-to-market for cloud support of new hardware types. Providing such support through native access, however, can leave vulnerable various aspects of the internal cloud, such as provisioning technology, billing, resource utilization and balancing, and the network layer-2 layout, for example, and can violate threat models well beyond customer requirements.

Systems and methods in accordance with various embodiments can provide for "partial" or "substantially" full access to a resource, such as a host server, by providing users with native access to the host hardware or specific devices, such as cards plugged into a peripheral control bus or similar datapath. In certain embodiments where specific levels of performance are an issue, technology such as an input/output memory management unit (I/O MMU) can be used to "assign" peripheral devices to guest operating systems (e.g., virtualization technology for directed I/O (Intel's VT-D)), effectively giving guests native access to only those peripheral devices. As should be apparent to one of ordinary skill in the art, a guest operating system (OS) can refer to different systems in different embodiments, such as a virtual machine hosting a running OS with at least partial non-virtualized access to some hardware or machine state that the OS or hypervisor depends upon including BIOS, configuration, etc., that is not under the administrative control of the hosting provider. In other embodiments, the guest OS might refer to an OS that is not under the administrative control of the hosting provider running without full virtualization. In one embodiment, an MMU can logically connect a direct memory access (DMA)-capable I/O bus (e.g., a PCI bus) to main memory on a host, and can manage mapping of I/O devices to physical addresses to regulate the flow of information from a guest to various PCI or similar devices. These devices can include, for example, graphics processing unit (GPU) co-processors, high-performance NICs, disk controllers, or other "niche" co-processing devices, such as cryptographic cards or hardware codecs. In some instances, virtualization or other such technology can be used to provide a level of separation between guests and host machines from the central system hardware (e.g., CPU, memory, etc), with native access potentially being available for specific devices on a given host. In other embodiments, native access can be provided to any hardware included in, or available for, a specific host.

One of the main issues with providing customers with native access to specific hardware is that customers may have the ability to modify privileged configuration or BIOS (basic I/O system) settings, or other firmware images on host hardware. These changes can persist across a reboot of the physical system, such that the hardware may not return to the same state that the hardware was in before that customer was granted access to the device(s). In the case of configurable settings for a virtual machine monitor (VMM), such as a Ring-1 hypervisor, for example, the changes would in general not persist across reboot, but could persist across instantiations of guest operating systems in a virtualized environment (e.g., chipset settings to support IOMMU technology). This ability for a customer to modify settings or firmware that otherwise should be immutable can have serious security implications. For example, malicious software (e.g., Trojans or viruses) can be inserted into firmware for various devices. Even if firmware changes do not involve intentionally malicious programming, however, the changes still can still be unintentionally damaging by causing performance and/or compatibility issues. Firmware flashing can potentially physically destroy the hardware irreparably (a.k.a. "bricking" the hardware). Certain technologies have been developed that may address at least some of these challenges, particularly for motherboard chipsets. These technologies include, for example, Trusted Platform Module (TPM), LaGrande Technology (LT) from Intel, measured boot technology, trusted boot technology, Dynamic Root of Trust (DRTM), and Static Root of Trust (SRTM) technology. None of these solutions, however, address various issues specific to device firmware, entire hosts, and other such hardware aspects.

Figure 3:
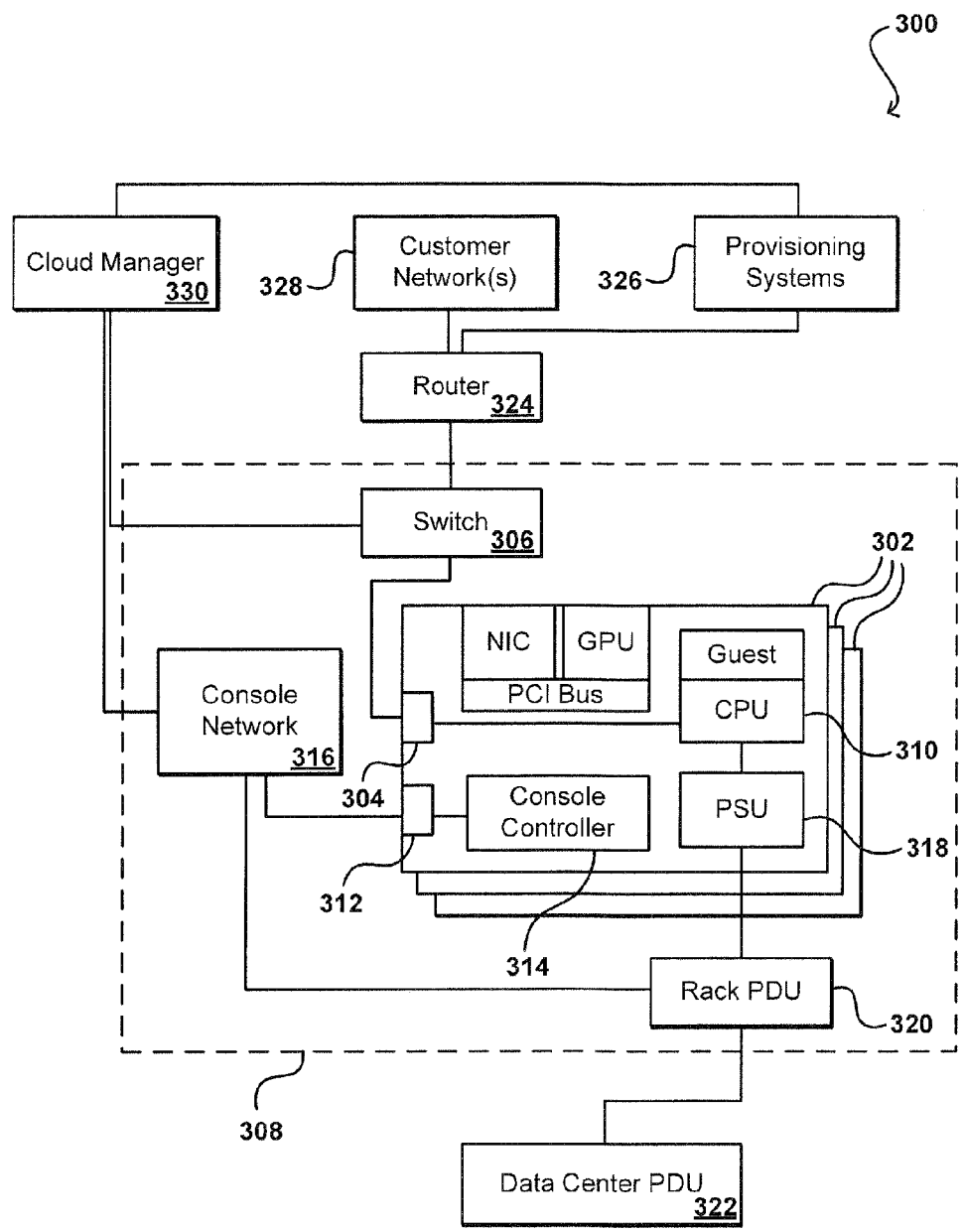
FIG. 3 illustrates a configuration for accessing specific hardware resources that can be used in accordance with one embodiment.

Systems and methods in accordance with various embodiments can prevent and/or monitor the access and/or manipulation of configuration or firmware information by guests in a cloud or similar electronic environment. In certain embodiments, a customer can be provided with dedicated guest access to a hardware resource for any desired period of time, such as a matter of hours or even minutes. FIG. 3 illustrates an example of a configuration 300 that can be used to provide such native access to a customer in accordance with one embodiment. This example will be discussed with respect to granting a user access to a peripheral device in a host machine using conventional PCI-based technology, but it should be understood that this is merely an example and that approaches within the scope of the various embodiments can be used with any appropriate hardware, software, and protocols currently used or subsequently developed for such purposes.

This example configuration 300 includes a set of host devices 302, such as servers or similar devices, that each can have a series of network ports 304. Some of these ports can function as "production" ports which connect each host to at least one "smart" network switch 306 capable of processing and routing network traffic to/from each device. In a data center example, there might be one smart switch for each rack of servers 308, for example. At least one of these network ports 304 can be used by a guest operating system for a host, where the guest is effectively operating "on top of" at least one central processing unit (CPU) 310 in the allocated or partitioned host device (e.g., server) 302 that has access to this production network port. The host device 302 also can have at least one console port 312 and a console controller 314, which can connect to a separate console network 316. In some embodiments, at least some of these ports can be merged but logically separated (e.g., muxed on the same physical port). Each host device also can have one or more dedicated power supply units (PSUs) 318, which can be accessed by the console controller and/or the main CPU, whereby the machine can be powered off via either the host CPU or a device on the network, for example. The power supply for every server in a rack can be connected to a rack power distribution unit (PDU) 320, which can be connected by a higher power cable to one or more data center PDUs 322, each of which can support multiple rack PDUs. In some cases, the hosts 302 can be powered on and off by running a line to the console controller from the rack PDU with relays or other such components to power cycle each device.

At least one router 324 can connect the host devices to one or more provisioning systems 326, and the switch and/or router can manage access to these provisioning systems. In some embodiments, network traffic within a rack is aggregated in order to minimize the number of cables leaving each rack. In some embodiments a capability such as a preboot execution environment (PXE) exists on a host machine 302 at the production network port 304, such that power can be cycled using the console and when the machine boots the PXE code can execute on the network port. When the switch 306 is configured to connect a host machine 302 to the provisioning systems, the PXE can connect the device to the provisioning systems and boot the machine into a RAM (random access memory) disk or other block of storage, for example, which enables control operations such as firmware flashing or provisioning of a new customer image, A RAM disk with specialized drivers in one embodiment can be used to boot and/or run an untrusted or unknown image, which might not otherwise be able to boot on a specific machine Provisioning images thus can be received, over the network to the PXE, which contain provisioning code or firmware flashing code. Once provisioning is completed, authorized customer networks 328 can interact with the devices 302 via the switch 306. The provisioning and control systems can control the switch in real time with no humans involved, as the automatic switching of that path can be based on provisioning events and external coordination, for example. The coordination can be provided and/or managed by an external system, such as a cloud manager database and system 330, or other such control plane or control system as discussed elsewhere herein, which can instruct the provisioning system(s) 326, console network 316, and rack components to perform certain actions. The cloud manager 330 can include one or more workflow systems that work with a central database, in one embodiment, to perform various aspects of resource management.

When providing guest access in such an environment, there can be various challenges relating to the secure delivery of customer payloads, as well as the controlling of access to the network and the underlying hardware. On a conventional device with a standard operating system, a user having full access can operate, view, and update the firmware on any device or component in the machine. A modern server can have several embedded processors or similar components that each perform a specific task, and each of these components can have firmware and other configuration information that can be modified. Since devices in a cloud or other shared resource environment can be subsequently provisioned to another user, a guest could, for example, perform malicious actions such as injecting firmware in the network card to capture packets transmitted for subsequent users of that device. These captured packets then could be sent to any address or party, etc., as set forth in the modified firmware. A user could also, for example, make modifications to the device to optimize performance for that user's applications, where such optimizations may cause performance degradation for other users. It thus can be desirable to design or configure I/O devices and other bits of firmware on a machine in such way that, combined with aspects such as time to provisioning, these malicious or inadvertently detrimental acts would not be possible, or would at least be very difficult to implement without being detected.

Systems and methods in accordance with various embodiments can attempt to minimize and/or monitor the opportunity for guests with access to a resource to modify the firmware or otherwise modify particular aspects of those resources. In some embodiments, once the operating system or other such software is on a host device, permissions can be set such that users cannot access and/or modify specific aspects of the host, such as the firmware of various devices. Typically, a device will expose certain special calls and/or ports that are used for firmware flashing, and there is some level of control as to whether the device opens those ports and/or allows those events. Even if ports and events are exposed to a guest user, various approaches can be used to monitor and/or address specific actions taken by that user.

In various embodiments, at least one secure counter or other monotonic counting hardware mechanism can be implemented to track a number of changes and/or attempted changes to configuration information, such as firmware, in a hardware device. Such a counter can be used to verify that changes have not been made since last known "good" or verified state, such as by using standard cryptographic techniques including hashing and signing state information. In embodiments where a guest operating system is loaded onto a host device that includes a plurality of different hardware devices, such as peripheral cards, there can be a counter for one or more of these devices such that update attempts can be tracked for any or all of the hardware devices on a host. Each secure counter can be positioned and/or configured such that any attempt to update firmware or other configuration information for a respective device can cause a value of the counter to be adjusted. Using such an approach, a current state of the information for any hardware device can be verified, and any attempted changes can be acted upon as appropriate. For example, the firmware or configuration information can be verified to correspond to an expected state. In other embodiments, an alert can be triggered any time a change in the counter is detected, or the value of the counter is in an unexpected state. Various other variations exist within the scope of the various embodiments.

Figure 4:
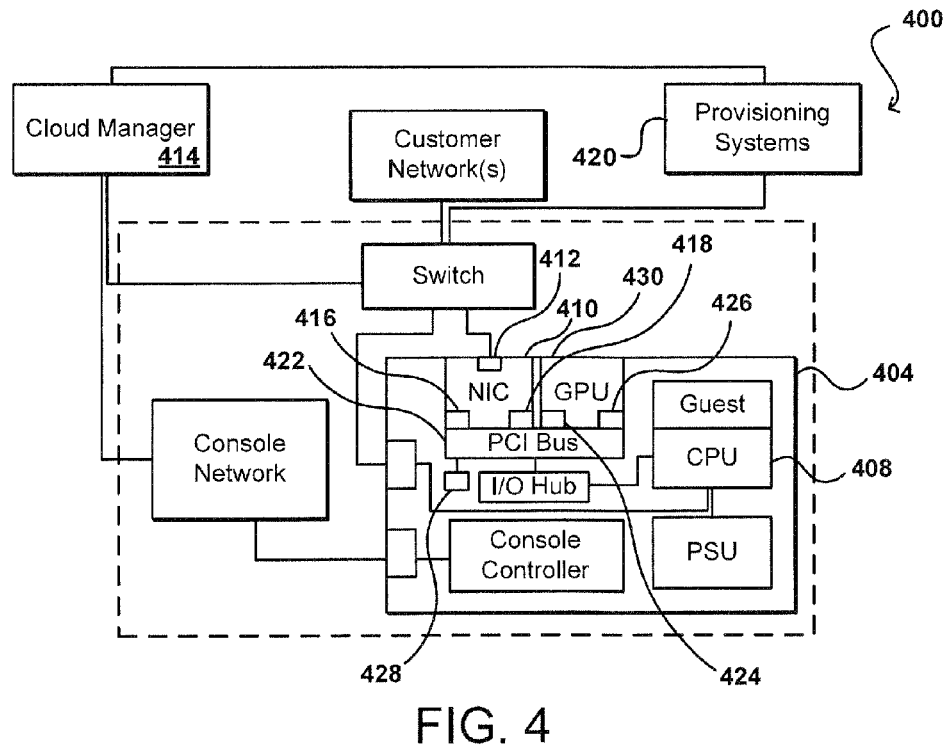
FIG. 4 illustrates a configuration for adjusting a current value of a counter upon an attempted update of firmware for a hardware resource that can be used in accordance with one embodiment.

FIG. 4 illustrates an example configuration 400 wherein a secure counter 416 is implemented in a network interface card (NIC) 410 of a host machine 404 in order to track an update state of the firmware 418 on the NIC. Although not shown, in some embodiments the counter 416 can sit along a path or "wire" between the PCI connector and the firmware, such that any communication with the firmware can cause the counter to update the current value. In some cases where there is a segregation or separation of read and write requests, the counter can be configured to only update upon write requests (or similar requests to attempt to modify the firmware). Thus, when an guest operating system (OS) is loaded on the host machine 404, or a user or application otherwise has access to the CPU 408, for example, any attempt to access and or modify the firmware will pass through the I/O hub and PCI bus 422 (or similar components) and be received through the PCI connector of the NIC, and thus will cause the counter 416 to adjust the count value accordingly. In various embodiments the counter will increment by one count each time a communication passes "through" the counter, while other increments, decrements, and mechanisms are possible within the scope of other embodiments.

In some embodiments, a user, application, guest OS, or other source can have access to update the configuration information such as the firmware 418 of the NIC 410, firmware 426 on a graphics processing unit (GPU) 430, firmware for the central processing unit 408, firmware for the Basic Input/Output System (BIOS) of the host machine 404, or any other component of the host machine 404. Each counter, such as a counter 416 for the NIC or counter 424 for the GPU, can be used to determine attempts to update specific firmware, such that it can readily be determined whether the firmware is in the expected state or may have been modified. For example, a cloud manager 414 or provisioning system 420 can communicate with the host to obtain the current count or value from the counter 416. In some cases this can be done during a time such as an initial boot phase where the user or guest OS will not be able to modify the value returned from the counter. In other cases, this value can be analyzed each time a user is to be provisioned onto the host, but before the provisioning process, to ensure that any or all components are in an expected state. If a counter does not return an expected value, an appropriate remedial action can be taken as discussed elsewhere herein. A "master" counter 428 also can be used, as discussed elsewhere herein, to aggregate the values of each counter, or at least increment when any associated counter is updated, to provide a single point for determination of firmware state for components of the host machine.

A secure counter in such an embodiment thus can allow for fast hardware reuse across administrative boundaries. If the counter is incremented, the slow process of hardware analysis can be performed, the hardware can be reset or re-initialized into some known good state, or another remedial action can be performed. The counter can avoid such a lengthy process and allow more efficient re-use when the counter is determined to be unchanged. The reset process on some devices also introduces "wear" (some memory systems like FLASH have a limited number of write cycles), such that the ability to avoid unnecessary resetting based on the secure counter provides yet another advantage.

In one embodiment, the secure counter is a flash-based counter that cannot be modified by a user, operating system (OS), central processing unit (CPU), or other aspect of the host machine. The value of the counter can be incremented automatically each time a user, application, or other source updates or otherwise attempts to write the firmware or other configuration information. A value of the counter can be stored each time the state of the firmware is validated or updated by an authorized source. As long as the value of the counter does not change, in at least some embodiments, the state of the firmware can be trusted to be in the expected state. If an authorized source does not update the firmware, but the value of the counter has changed, then the firmware on the device can be handled as being in a potentially "unknown" state. The value of the counter can be determined at any appropriate time, such as at machine boot, restart, power-on, or any other appropriate time. In some embodiments, a network component can periodically poll the counter for the current value in order to ensure that no updates have been made and/or attempted since a previous polling, validation, etc. In some embodiments, the administrative networking component performs this polling in a way that cannot be intercepted by the main CPU or otherwise by hardware that may be have been compromised by a user. This can be accomplished in one example using a dedicated port on a peripheral device and a secure channel from this port over the internal hardware interconnect (e.g. PCI bus) to the device being polled. In other embodiments, a separate dedicated port can be used for each device being polled, such that the secure channel is contained entirely within the device being polled. Various other combinations and variations can be utilized within the scope of the various embodiments as should be apparent to one of ordinary skill in the art in light of the teachings and suggestions contained herein.

In some embodiments the counter is physically built into the hardware, such as into a trusted platform module (TPM) or as a chip on the motherboard or as part of a hardware device. In certain embodiments, there can be a counter for each piece of mutable firmware on a host machine, such as on a device, in the BIOS, or in the CPU, as well as for any device or component that can be flashed or otherwise updated by a user, guest OS, or other such source. In some embodiments, a device can be configured such that each time an attempt to change the BIOS or firmware is detected, for example, the counter is updated automatically as part of the flashing process. In such an embodiment the counter does not necessarily have to be a physical counter in hardware, such as part of a chipset that drives the firmware, for example, but can be a virtual counter controlled using software and stored to an appropriate location. In some embodiments the counter can be incremented any time information goes to the firmware or other component corresponding to the counter, while in other embodiments the counter will only be incremented when certain operations or attempts are detected, such as an update to the firmware.

Figure 5:
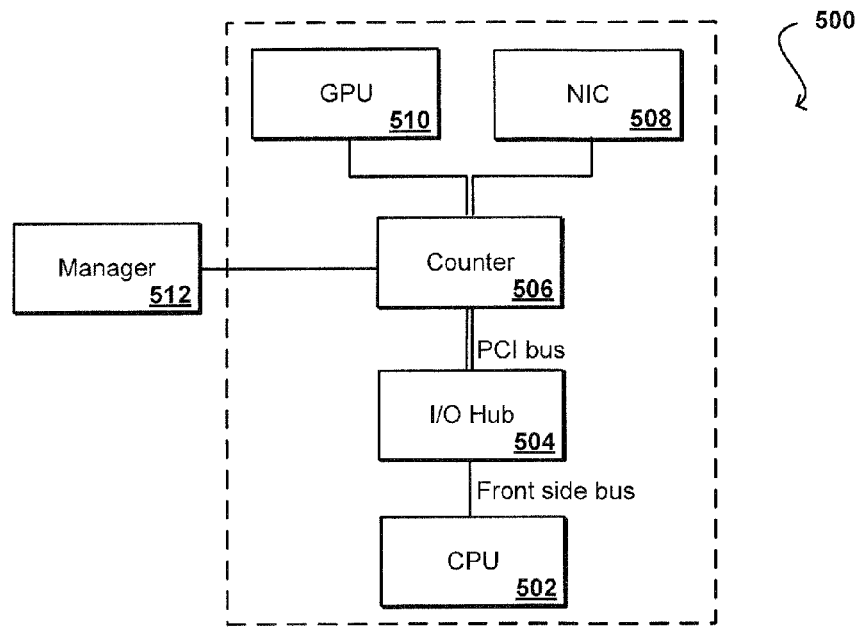
FIG. 5 illustrates a configuration for incrementing a counter upon an attempted update of firmware for a hardware resource that can be used in accordance with one embodiment.

One or more counters can be used in the various embodiments to track communications to any of a number of components. As illustrated in FIG. 4, any of the peripheral cards or other components can have a dedicated counter. FIG. 5 illustrates an example configuration 500 wherein a single counter 506 is used for any or all components (e.g., a NIC 508 or GPU 510) connected to a bus, such as a PCI bus managed by an I/O hub 504 or similar component. In this example the counter 506 is shown to reside on a path between the I/O hub and PCI components, although in some cases the counter can be included as part of the I/O hub itself. Using such an approach, the counter can monitor one or more paths along the bus. If there are five components connected to the bus, for example, there can be five separate counters monitoring the bus path to each component. In other embodiments, there can be a single counter for each path along the PCI bus, at least along each path to mutable firmware or other such information. In this way, the counter can be incremented any time a user, guest OS, CPU 502, or other source attempts to modify firmware for any of the devices on the bus.

As discussed, in certain embodiments a "master" counter can be used that increments each time an associated counter is incremented. In a host machine, a master counter can be configured to communicate with each counter over a secure channel inaccessible to a user of the host machine or CPU on the host machine, such that the master count cannot be modified, at least by an unapproved actor. For a group of machines, such as a rack of servers, a single master counter can be used to aggregate counter information for each machine. The current count of a master counter can be determined using approaches discussed herein for dedicated counters, such as by querying the value over a secure channel, while in some embodiments the master counter can also (or alternatively) provide a display, such as an LED display, at a visible exterior location such that a technician or other person at the physical location of the hardware can quickly determine whether the configuration information for the entire group is in the expected state. Such an approach can simplify the verification process in some embodiments, as a single number can be verified for all the components along the bus, in a host machine, in a server rack, etc. As discussed, in some embodiments the counter value can be obtained by the CPU, while in other embodiments there can be a path external to the CPU that connects with a network component such as a cloud manager system 512, which can obtain a current counter value and compare that value to the expected value to determine whether any of the monitored components might have been modified. Several other variations exist as well, as should be apparent.

In some embodiments, the firmware for a given hardware device can be immutable to the CPU or other host components, and can only be updated via an external channel. For example, FIG. 4 illustrates an update port 412 as part of the NIC 410 which can allow a cloud manager 414, provisioning system 420, or other such component to modify the firmware, which cannot be modified from the host machine itself. In such an embodiment, a counter 416 still can be used to monitor the activity of a user or guest on the host 404, such that a provider can be informed when a user attempts to update the firmware and can take an appropriate remedial action. In some cases, a user having the machine provisioned will be unaware of the update attempt, and such an approach can allow the user to be informed of the use, which might violate policy agreements, etc. An update port also can be used to obtain the actual value of the counter, independent of other components on the host.

In many of these embodiments, the counter is a secure counter that is independent of the CPU or other such processing component of the host device. Such a configuration can prevent the CPU from modifying the value of the counter, such as to change the value back to a previous value after an update or update attempt. For example, if the expected counter value is twelve and the CPU is able to modify the counter, the CPU could update the firmware on a device, which would cause the counter to increment to thirteen, which would indicate that the firmware might have been modified. The CPU then could adjust the value of the counter back to twelve, however, which would cause the host to appear to a monitoring system as if the firmware is in the expected state. In some cases, a CPU controlling the counter could simply prevent the counter from being implemented on an update. For similar reasons, various embodiments enable the count value to be obtained without passing through the CPU, such that the CPU could potentially intercept the actual value and replace that value with the expected value, etc. Since a CPU in some embodiments is a component that can be relatively easily compromised, it can be desirable in at least some of those embodiments to implement the counter and the retrieval of the count independently of the CPU or other such component(s).

In order to utilize such a counter effectively, the expected counter values can be determined accurately and managed securely in various embodiments. In one embodiment, firmware is only updated by an authorized provider and is never allowed to be updated from the user. In such an embodiment, the counter value can be determined after each flashing or updating of a device, and can be stored to a secure location such as a central database for a cloud manager or similar system external to the host and not exposed to guest users. Since the user is not allowed to update the firmware, the count value should always correspond to the expected value stored in the central location. In some embodiments the expected value can be stored on the hardware itself in a secure location that is not accessible to the user, such as in static RAM or FLASH memory that does not have a mapping exposed to the user or in an inaccessible portion of the I/O hub. In some embodiments, the expected value can be digitally signed, encrypted, or otherwise cryptographically secured such that the value is not easily determined and/or modified by a guest user. In cases where an encrypted or signed value is stored on the device but the value cannot properly be retrieved, such as where modified or deleted by a user, the state of the hardware can be treated as if the actual and expected values do not match, and a validation or authentication process can be executed.

The value stored in the counter can be verified at any of a number of times using any of a number of approaches in accordance with the various embodiments. In some embodiments, the machine can be configured to verify the value at startup, boot, or any other such time, such as by comparing the expected value of the counter stored in a secure location with the current value of the counter. If the values do not match an appropriate remedial action can be taken, such as to halt booting of the machine or send a notification that the values do not match. In some cases, the hardware device can be configured to "push" the value to an appropriate component at startup, at regular intervals, upon specific actions (e.g., changes in value), or at any other appropriate time. In some embodiments, this can include sending the value to a cloud manager system that is able to verify the current value against the expected value, and take appropriate actions where the values do not match. In other embodiments, a component such as a cloud manager can be configured to periodically poll the hardware for the current value, which then can be compared to the expected value. Other mechanisms for comparing the actual and expected value can be used as well within the scope of the various embodiments.

Figure 6:
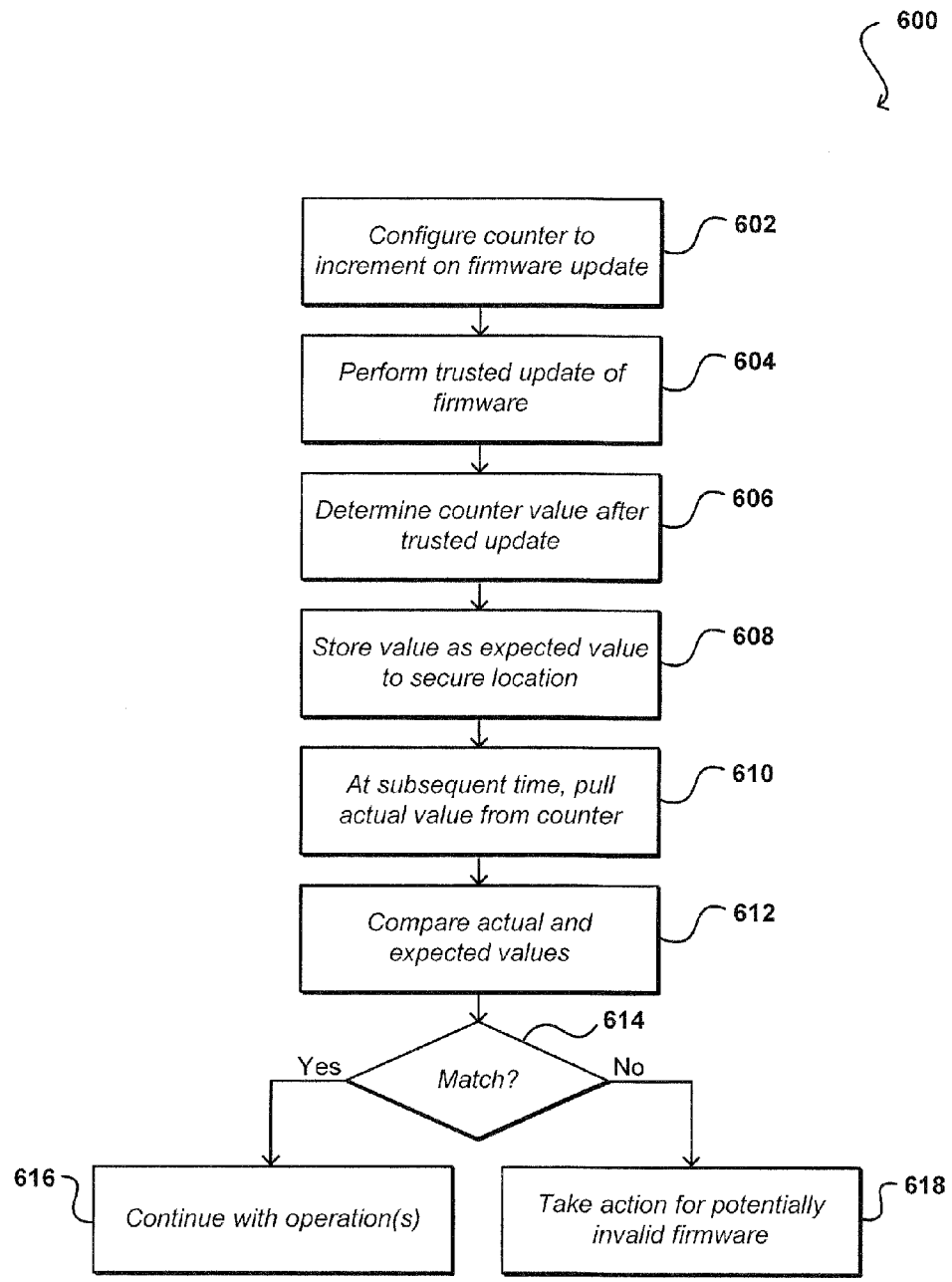
FIG. 6 illustrates an example of a process for tracking expected firmware states that can be used in accordance with one embodiment.

FIG. 6 illustrates an example of one such process 600 for monitoring the state of firmware that can be used in accordance with one embodiment. In this process, a counter is configured to increment or otherwise update state upon an update to firmware or other such action as discussed herein 602. This can take the form of physically installing the counter along the appropriate path between components, installing the counter in one of the components, programming a virtual counter stored in memory, or any other such action. Once the counter is configured and operational, the firmware can be updated using a trusted process 604, such as by flashing the firmware using a verified firmware image. Upon flashing of the firmware, a current value of the counter can be determined 606 (that was incremented upon the flashing) and the current value can be stored as an expected value to a secure location 608. As discussed, this can be a location internal or external to the hardware device and/or host machine. At a subsequent time, such as during an initial phase of a boot process or at any other appropriate time, the actual value of the counter can be determined 610. The actual and expected values can be compared using any of the processes discussed or suggested herein 612. A determination can be made as to whether the actual value matches the expected value 614. If the values match, then the desired operations can occur and/or continue 616, such as to continue booting the machine or allowing guest access to the machine. If the values do not match, at least one appropriate action can be taken based upon the potentially invalid firmware 618, such as by isolating the host machine, stopping a boot process, or moving a guest to another hardware instance. While discussed with respect to firmware, it should be understood that this is merely for explanatory purposes and that a counter can monitor any changes, updates, communications, or other such transfers as discussed and suggested herein. Further, although the process is shown as a series of steps, it should be understood that no ordering of the steps is to be implied unless otherwise stated, and that there are additional, fewer, and alternative steps that can be performed in accordance with various embodiments.

Various other actions can be taken upon a determination that the actual and expected values do not match, which can depend at least in part upon the embodiment(s). For example, if it is determined that the values do not match for a peripheral device that is currently provisioned to a particular user, the action might involve storing a flag or other identifier for that hardware that the firmware for that device should be flashed before provisioning another user. In other embodiments, a notification might be sent to a central provisioning system or cloud manager to move the guest to another hardware instance where the firmware is in an expected state. In other embodiments, the peripheral device, for example, can be disabled and only the hardware that is in the expected state will be provisioned to subsequent users—for example, the rest of the hardware on the host without the peripheral device. In some embodiments, any current process can be halted and the host or device isolated. In other embodiments, the difference in values can trigger a "validate" or similar process, wherein the actual state of the firmware is compared with the expected state of the firmware, such as by performing a hashing or other such process known for comparing two pieces of information to determine whether that information is the same. It can be the case in various embodiments that multiple different configurations can be considered valid. In other words, there can be a catalog of valid states, any of which can be considered to be valid by the validation process. Thus, changes in some case can actually correspond to valid changes. Likewise, the firmware image can be "changed" to a configuration that is identical to the previous state (i.e., the counter can be triggered, but the firmware or configuration state did not effectively change). If the firmware is validated, the current value of the counter can be stored as the expected value and operation of the device can continue. If the firmware is not what is expected, an action can be taken such as those discussed above. In some cases, any change in the value will cause a human to be paged or otherwise notified, who can examine the hardware to determine if anything has changed unexpectedly, and can fix or place the machine back into an expected state. This could require physical access to the host hardware, for example, such as to reset a hardware switch or other such mechanism.

In some embodiments, a user can be authorized to update the firmware as desired. In such an embodiment, the value of any counters can be used to determine which pieces of firmware or other such information may have been changed, such that the process of flashing the devices before provisioning a new guest can be simplified to only include those components with incremented counter values. In some embodiments a user can apply approved updates and must notify the provider of each update, such that the provider can update the expected value of the counter. In this way, the expected and actual values will match as long as the user always notifies the central managing component or system, and applies approved updates.

In some embodiments, such as in a cloud environment, users might be provisioned to a device at a rate no higher than every 5, 15, or 60 minutes, for example, such that for a 32 bit count register included on-chip within a microcontroller, for example, it will be unlikely that the counter will reach the maximum value during the lifetime of the counter. For smaller counters, however, there may need to be procedures in place to reset the counter at certain times. This can include notifying a human to do a manual reset requiring physical access to the device, resetting the counter in software, or performing any other such procedure for resetting a counter as known or subsequently developed for such purposes. In some embodiments, resetting the counter may require cryptographic authorization or procedures known for such purposes. In some embodiments, undesired action such as rollover aliasing can be addressed by permanently preventing further changes to firmware or other configuration information once the counter is maxed out, such as in the case of blowing a fuse. In such cases, physical access to the machine can be required to reset a counter, to enable a data center or other employee to reset a device without allowing a user having locked up a device to be able to remotely reset the device.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers. Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
    one or more processors; and
    a memory device including instructions, which when executed by the one or more processors, cause the system to:
        store a value of a secure counter as an expected value within a secure location;
        provision a guest operating system to enable a user to remotely access the guest operating system via a network connection, the guest operating system having direct, non-virtualized access to at least one device of a host system;
        cause the secure counter to be updated for at least one attempted modification of configuration information for the at least one device;
        determine, based at least in part on a current value of the secure counter as compared to the expected value, whether the guest operating system attempted to modify the configuration information for the at least one device; and
        perform at least one action with respect to at least one of the host system or the at least one device in response to determining that the current value of the secure counter does not correspond to the expected value.

2. The system of claim 1, wherein the user is a customer of a service provider and the host system is operated by the service provider.

3. The system of claim 1, wherein the at least one action includes at least one of re-flashing the at least one device or the host system, limiting access to the at least one device or the host system, isolating the at least one device or the host system, discontinuing a boot process of the at least one device or the host system, performing a validation process for the at least one device or the host system, provisioning the guest operating system on a second host system, resetting the at least one device or the host system, shutting down the host system, or shutting down a user network including the host system.

4. A computer-implemented method, comprising:
    provisioning a guest operating system having direct, non-virtualized access to at least one device of a host system;
    causing a counter to be updated for at least one attempted modification of configuration information for the at least one device; and
    performing at least one action with respect to at least one of the host system or the at least one device in response to a determination that a value of the counter does not correspond to an expected value,
    wherein the expected value is stored in a location inaccessible to the guest operating system.

5. The computer-implemented method of claim 4, further comprising:
    determining that the configuration information was modified without authorization based at least in part on the determination that the value of the counter does not correspond to the expected value.

6. The computer-implemented method of claim 4, wherein the counter is integrated within at least one of the host system, a network interface card, or along a path between a Peripheral Component Interconnect (PCI) bus and the at least one device.

7. The computer-implemented method of claim 4, further comprising:
    receiving, from a control plane computer system, a set of configuration information; and
    updating the configuration information without updating the counter.

8. The computer-implemented method of claim 4, wherein the at least one action includes indicating that the configuration information of the host system is to be flashed before provisioning a subsequent guest operating system on the host system.

9. The computer-implemented method of claim 4, further comprising:
    communicating with a provisioning system to transmit the expected value of the counter.

10. The computer-implemented method of claim 4, further comprising:
    causing at least one second counter to be updated to a second value for each second attempted modification of second configuration information for at least one second device of the host system.

11. The computer-implemented method of claim 10, further comprising:
    causing a master counter to use the value and the second value to determine a master expected value.

12. The computer-implemented method of claim 11, wherein the master counter corresponds to a rack of servers, the rack of servers including the host system.

13. The computer-implemented method of claim 4, further comprising:
    encrypting or digitally signing the expected value.

14. The computer-implemented method of claim 4, wherein the expected value is stored in a memory location of the host system or a remote data store.

15. The computer-implemented method of claim 4, wherein the at least one device is at least one of a central processing unit, a graphics processing unit, a disk controller, a network interface card, a PCI bus, a cryptographic card, a hardware codec, a co-processing device, a peripheral device, an input/output chipset, an element on a bus, or a data path routing component.

16. The computer-implemented method of claim 4, wherein the counter is a monotonic counter.

17. The computer-implemented method of claim 4, wherein the configuration information comprises firmware for at least one of a central processing unit, a Basic Input/ Output System (BIOS), or a peripheral device.

18. A non-transitory computer-readable storage medium storing instructions for managing configuration of a computing system, the instructions, which when executed by one or more processors, cause the one or more processors to:
   store a first value of a counter as an expected value;
   provision a guest operating system having direct, non-virtualized access to at least one device of a host system;
   cause the counter to be updated for at least one attempted modification of configuration information for the at least one device;
   determine, based at least in part on the first value of the counter, whether the guest operating system attempted to modify the configuration information for the at least one device; and
   perform at least one action with respect to at least one of the host system or the at least one device in response to determining that a second value of the counter does not correspond to the expected value.

19. The non-transitory computer-readable storage medium of claim 18, wherein the expected value is encrypted, digitally signed, or stored in a memory location of the host system or a remote data store that is inaccessible to a user of the guest operating system.

20. The non-transitory computer-readable storage medium of claim 18, wherein a user has applied an authorized modification to the configuration information, and the instructions, which when executed by the one or more processors, further cause the one or more processors to:
   obtain a notification from the user that the user applied the authorized modification to the configuration information; and
   update the expected value of the counter based on the notification.

21. The non-transitory computer-readable storage medium of claim 18, wherein the at least one action includes at least one of re-flashing the at least one device or the host system, limiting access to the at least one device or the host system, isolating the at least one device or the host system, discontinuing a boot process of the at least one device or the host system, performing a validation process for the at least one device or the host system, provisioning the guest operating system on a second host system, resetting the at least one device or the host system, shutting down the host system, or shutting down a user network including the host system.

* * * * *